United States Patent
Limbasia et al.

(10) Patent No.: US 9,268,456 B2
(45) Date of Patent: Feb. 23, 2016

(54) EFFICIENT IMAGE MANAGEMENT FOR MEDIA MANAGER

(75) Inventors: Sunil Limbasia, Irving, TX (US); Abhilash Paul, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 367 days.

(21) Appl. No.: 13/214,899

(22) Filed: Aug. 22, 2011

(65) Prior Publication Data

US 2013/0055081 A1    Feb. 28, 2013

(51) Int. Cl.
*G06F 3/0481*    (2013.01)
*G06F 3/0484*    (2013.01)

(52) U.S. Cl.
CPC .......... *G06F 3/0481* (2013.01); *G06F 3/04842* (2013.01)

(58) Field of Classification Search
CPC ................................................. G06F 3/04842
USPC ....................................................... 715/716
See application file for complete search history.

(56) References Cited

U.S. PATENT DOCUMENTS

| | | | |
|---|---|---|---|
| 2005/0091111 A1* | 4/2005 | Green et al. | 705/14 |
| 2005/0216866 A1* | 9/2005 | Rosen et al. | 715/856 |
| 2005/0273723 A1* | 12/2005 | Sharpe | 715/764 |
| 2012/0287116 A1* | 11/2012 | Massimino et al. | 345/419 |

OTHER PUBLICATIONS

Lennartz, Sven; The Mystery of CSS Sprites: Techniques, Tools and Tutorials; Apr. 27, 2009; Smashing Magazine; pp. 1-24.*

* cited by examiner

*Primary Examiner* — Jennifer To
*Assistant Examiner* — Ashley Fortino

(57) ABSTRACT

A device may access a single interface image file that includes interface images and generate a media manager interface using the interface images of the interface image file. The device may present the media manager interface for display and detect interface activity corresponding to the interface images presented for display as part of the media manager interface. The device may replace the interface images used to generate the media manager interface with one or more other interface images of the image file, based on the interface activity, to generate a modified media manager interface, and present the modified media manager interface for display.

20 Claims, 9 Drawing Sheets

| IMAGE FILE HEADER | | |
|---|---|---|
| IMAGE FILE DIRECTORY | | |
| IMAGE IDENTIFIER | IMAGE LOCATION | IMAGE SIZE |
| IDENTIFIER-1 | 1.1 | .1 KB |
| IDENTIFIER-2 | 1.2 | .3 KB |
| IDENTIFIER-3 | 1.3 | .1 KB |
| IDENTIFIER-4 | 1.4 | .2 KB |
| IDENTIFIER-5 | 2.1 | .3 KB |
| IDENTIFIER-6 | 2.2 | .1 KB |
| IDENTIFIER-7 | 2.3 | .2 KB |
| IDENTIFIER-8 | 2.4 | .2 KB |
| ... | ... | ... |

| IMAGE FILE BODY | | | |
|---|---|---|---|
| IMAGE 110-1 | IMAGE 110-2 | IMAGE 110-3 | IMAGE 110-4 |
| IMAGE 110-5 | IMAGE 110-6 | IMAGE 110-7 | IMAGE 110-8 |
| ... | ... | ... | ... |

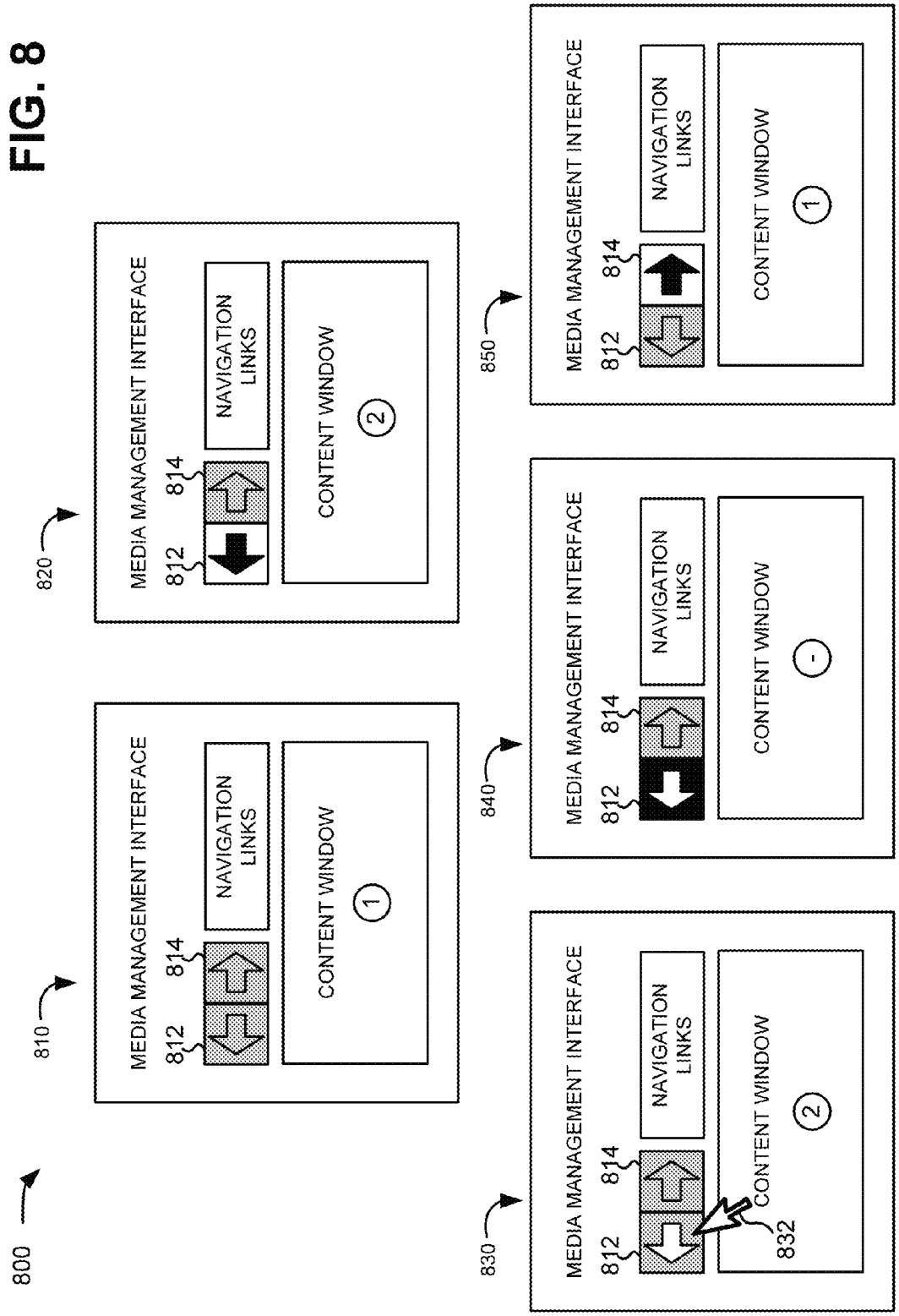

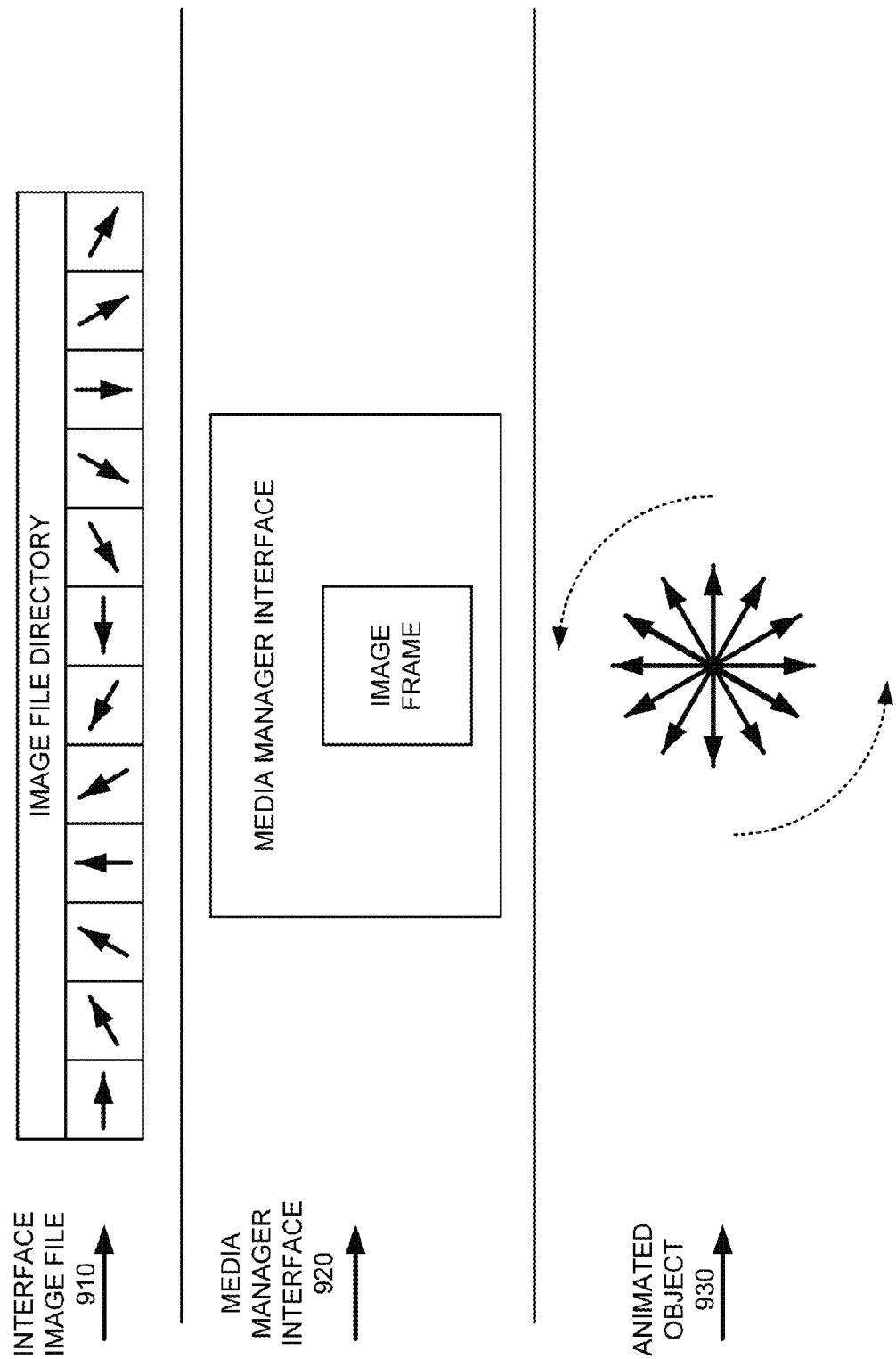

EFFICIENT IMAGE MANAGEMENT FOR MEDIA MANAGER

BACKGROUND

Current solutions for managing electronic forms of media (e.g., music files, video files, text files, etc.) include software programs that can enable a user to browse, purchase, and/or download electronic forms of media. While such computer programs can be helpful in obtaining and managing electronic media, such computer programs can also suffer from various deficiencies. For instance, some media management programs require a significant number of image files to operate properly, which can require a significant time to install, can increase the risk that some images files will not be installed or upgraded properly, and can increase the risk that some images will be displayed improperly if, for example, a user intentionally, or unintentionally, changes one or more images.

BRIEF DESCRIPTION OF THE DRAWINGS

FIG. 6 is a diagram of an example image file according to one or more implementations described herein;

FIG. 8 is a diagram of example media management interfaces according to one or more implementations described herein; and FIG. 9 is a diagram of an example solution for animating user interface objects according to one or more implementations described herein.

DETAILED DESCRIPTION OF PREFERRED EMBODIMENTS

The following detailed description refers to the accompanying drawings. The same labels and/or reference numbers in different drawings may identify the same or similar elements.

In one or more implementations, described herein, devices may be used to provide an efficient and reliable solution to managing media manager images. For example, a device may access an image file that includes interface images, and generate a media manager interface using the interface images of the image file. The device may detect interface activity corresponding to the interface images used to generate the media manager interface and replace one or more of the interface images used to generate the user interface with another interface image of the image file based on the interface activity. Accordingly, one or more implementations described herein may include managing multiple interface images in a media manager interface by using only one image file.

Figure 1:
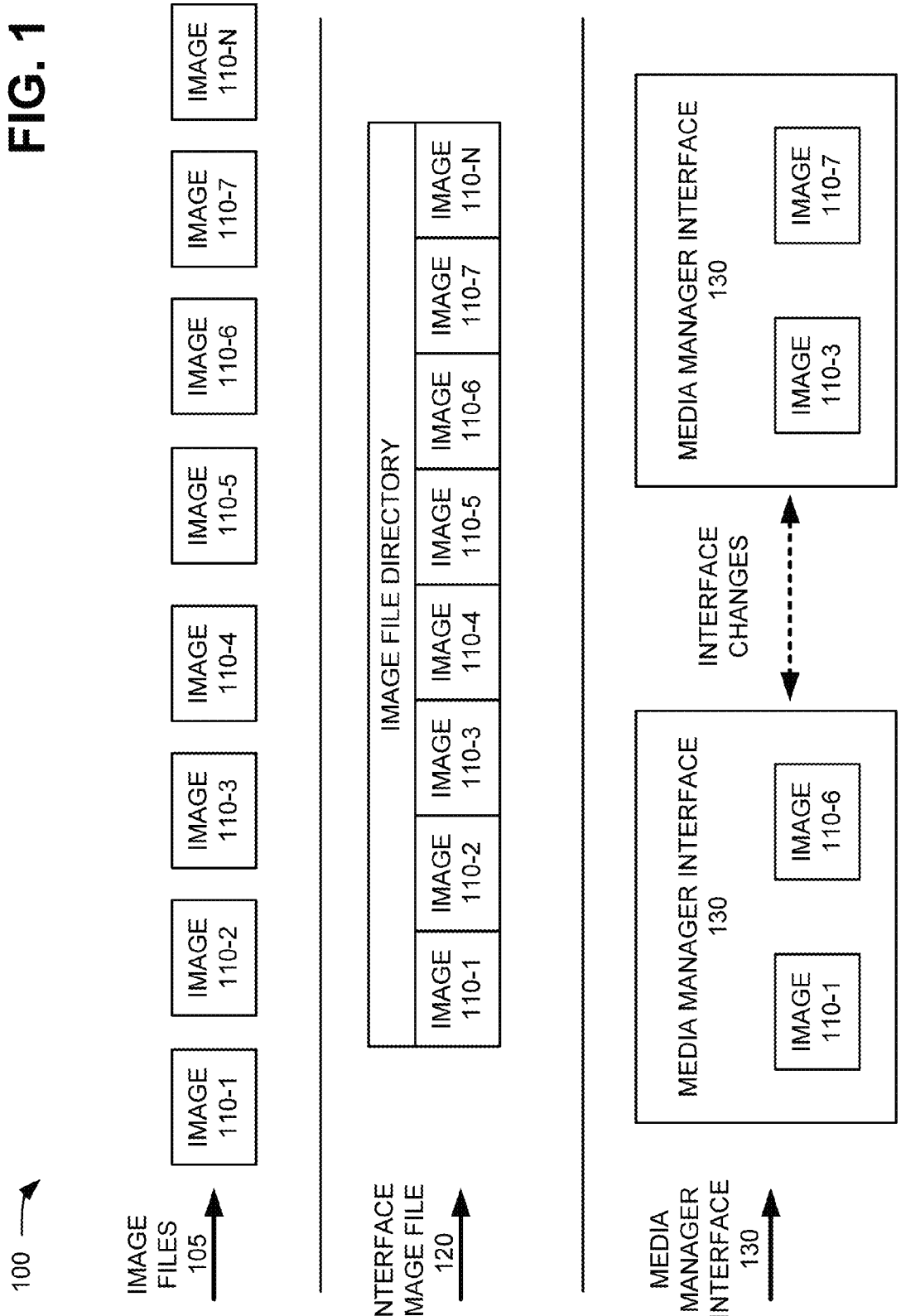
FIG. 1 is a diagram of an example overview of an implementation described herein.

FIG. 1 is a diagram of an example overview 100 of an implementation described herein. As illustrated, overview 100 may include image files 105 that include interface images 110-1, 110-2, 110-3, 110-4, 110-5, 110-6, 110-7, ..., 110-N, (where N≥1) (collectively referred to as "interface images 110," and individually as "interface image 110"), an interface image file 120, and a media manager interface 130.

Image files 105 may include image files corresponding to one or more of a variety of image file formats. For example, image files 105 may include a joint photographic experts group (JPEG) file format, a tagged image file format (TIFF) file format, a portable network graphics (PNG) file format, a graphics interchange format (GIF) file format, a bitmap (BMP) file format, or another type of image file format. The interface images 110 of image files 105 may correspond to one or more user interface objects, such as a user interface button, a user interface menu option, user interface content (e.g., an image representing an audio file, an image representing a video file, etc.), or one or more other types of user interface objects.

Interface image file 120 may include a combination of interface images 110. Similar to image files 105, image file 120 may correspond to a wide variety of image file formats, including a JPEG file format, a TIFF file format, a PNG file format, a GIF file format, a BMP file format, or another type of image file format. Interface image file 120 may also, or alternatively, include an image file directory to enable a device to identify the location of each interface image 110 in interface image file 120. The image file directory may be located in a header of interface image file 120. Interface images 110 may be located in a body of interface image file 120.

Media manager interface 130 may include one or more user interface objects. For instance, media manager interface 130 may include navigation buttons, menu options, content windows, help functions, search functions, customizable options, media control buttons (e.g., play, stop, rewind, fast forward, etc.), or one or more other types of user interface objects. In some implementations, media manager interface 130 may correspond to a file management software program, such as a media manager application. As depicted, media manager interface 130 may include one or more interface images 110 from interface image file 120.

In some implementations, while all of interface images 110, included in media manager interface 130, may come from interface image file 120, the interface images 110 displayed may change from time-to-time. For example, at one point in time, media manager interface 130 may include interface image 110-1 and interface image 110-6, whereas, at another point in time, media manager interface 130 may include interface image 110-3 and interface image 110-7. In some implementations, these changes in interface images 110 may be a result of interface activity, such as a user selecting an interface button, executing a search command, selecting one or more user interface options or functions, or one or more other types of interface activity. Accordingly, in one or more implementations described herein, a single interface image file 120 may be used to satisfy the interface image requirements of a media manager application or another type of software application involving a user interface.

Figure 2:
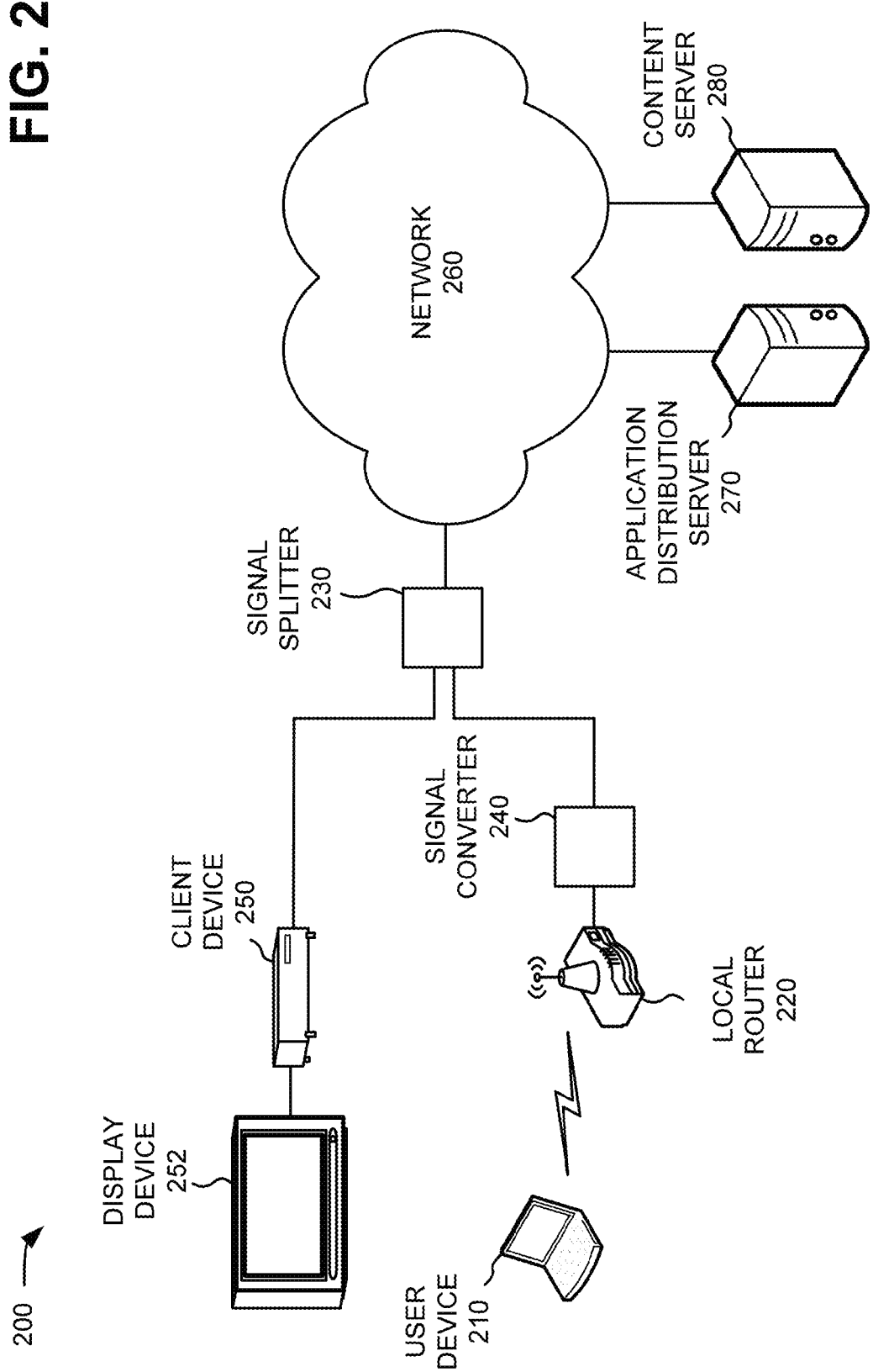
FIG. 2 is a diagram of an example environment in which systems and/or methods, described herein, may be implemented.

FIG. 2 is a diagram of an example environment 200 in which systems and/or methods, described herein, may be implemented. As illustrated, environment 200 may include user device 210, local router 220, signal splitter 230, signal converter 240, client device 250, display device 252, network 260, application distribution server 270, and content server 280. While FIG. 2 shows a particular number and arrangement of networks and devices, in alternative implementations, environment 200 may include additional networks or devices, fewer networks or devices, different networks or devices, or differently arranged networks or devices than those depicted in FIG. 2.

User device 210 may include one or more of a variety of computing devices. For example, user device 210 may include a smart phone, a laptop computer, a tablet computer, a desktop computer, or one or more other types of computing or communication devices. User device 210 may include a media manager application for managing media files stored by user device 210 and/or browsing, purchasing, and/or downloading additional media files. In some implementations, the media manager application may enable a user to stream media files stored by user device 210 to one or more other devices, including other user devices 210, client device 250, display device 252, and/or one or more other types of electronic devices.

Local router 220 may include a device that provides connectivity between user device 210 and network 260. In some implementations, local router 220 may include a wireless access point that employs one or more short-range wireless communication protocols for a wireless local area network (WLAN), such as, for example, IEEE 802.15 (e.g., Bluetooth) and/or IEEE 802.11 (e.g., WiFi). In certain implementations, different short-range wireless protocols and/or frequencies may be used. Local router 220 may also include one or more wired (e.g., Ethernet) connections. In implementations where network 260 includes a Long-Term Evolution (LTE) network, local router 220 may include a universal serial bus (USB) Ethernet Router that is capable of meeting LTE quality of service (QoS) standards.

Signal splitter 230 may include one or more splitting technologies to convey information between user device 210, client device 250, and network 260. In one implementation, signal splitter 230 may include a coaxial splitter that operates in accordance with the single wire multi-switch (SWiM) standard or one or more other types of network standards or protocols. For example, signal splitter 230 may facilitate allocating logical channels using different frequency blocks for viewer-selected television programming and broadband signals to SWiM-compatible client device 250 and/or local router 220.

Signal converter 240 may include a device, such as a modem, to convert signals communicated between signal splitter 230 and local router 220. In some implementations, for example, signal converter 240 may include a coaxial port and an Ethernet port. In such implementations, signal converter 240 may convert signals received from signal splitter 230, via the coaxial port, to signals that signal converter 240 may output, via the Ethernet port, to local router 220. Additionally, or alternatively, signal converter 240 may convert signals received from local router 220, via the Ethernet port, to signals that signal converter 240 may output, via the coaxial port, to signal splitter 230. One or more implementations, discussed herein, may include alternative implementations of signal converter 240.

Client device 250 may include a device that receives and/or processes video content, and provides the video content to display device 252 or another device. Client device 250 may include a set-top-box (STB), a cable card, a computer, and/or another type of device. Client device 250 may also, or alternatively, include decoding and/or decryption capabilities and may further include a digital video recorder (DVR) (e.g., a hard drive). In one implementation, client device 250 may conform to the multimedia over coax alliance (MoCA) standard, the SWiM standard, and/or one or more other types of networking standards or protocols.

Display device 252 may include a television monitor capable of displaying video content, television programming, content provided by client device 250, and/or content provided by other devices (e.g., user device 210, a digital video disk (DVD) player, a video camera, etc.) connected to display device 252. In some implementations, one or more of the components or functionalities of client device 250 may be incorporated into display device 252.

Network 260 may include any type of network or combination of networks. For example, network 260 may include a local area network (LAN) (e.g., an Ethernet network), a WLAN (e.g., an IEEE 802.11 network), a wide area network (WAN) (e.g., the Internet), and/or a wireless WAN (WWAN) (e.g., a Long-Term Evolution (LTE) network, a High-Speed Packet Access (HSPA) network, an Evolved High Rate Packet Data (eHRPD) network, etc.). Network 260 may also, or alternatively, include an Internet Protocol (IP) multimedia subsystem (IMS) network, a fiber optic (e.g., a fiber optic service (FiOS)) network, a Voice over IP (VoIP) network, a metropolitan area network (MAN), an ad hoc network, a virtual network (e.g., a virtual private network (VPN)), and/or a telephone network (e.g., a Public Switched Telephone Network (PSTN)).

Application distribution server 270 may include one or more of a variety of computing devices. For example, application distribution server 270 may include a server, a cluster of servers, or one or more other types of computing or communication devices. In implementations where application distribution server 270 includes multiple devices, the devices may be located in a single geographic location or multiple geographic locations. Application distribution server 270 may include one or more media manager applications that may include one or more data files (e.g., program files, executable files, configuration files, directory files, compressed files, catalog files, media files, interface image files, etc.), defining or otherwise corresponding to the operation and/or structure of a media manager application. Application distribution server 270 may communicate a media manager application or a media manager application update to user device 210.

Content server 280 may include one or more of a variety of computing devices. For example, content server 280 may include a server, a cluster of servers, or one or more other types of computing or communication devices. In implementations where content server 280 includes multiple devices, the devices may be located in a single geographic location or multiple geographic locations. Content server 280 may be capable of storing media content (e.g., books, music, videos, etc.) and providing media content to user device 210.

While FIG. 2 shows a particular number and arrangement of networks and devices, in alternative implementations, environment 200 may include additional networks or devices, fewer networks or devices, different networks or devices, or differently arranged networks or devices than those depicted in FIG. 2. For example, as mentioned above, in some implementations, network 260 may include an optical fiber network (e.g., a fiber optic network). In such implementations, environment 200 may include an optical fiber network terminal (ONT), which may replace signal splitter 230 and/or signal converter 240. In such implementations, local router 220 may be repositioned to route information between the ONT, user device 210, and/or client device 250.

Figure 3:
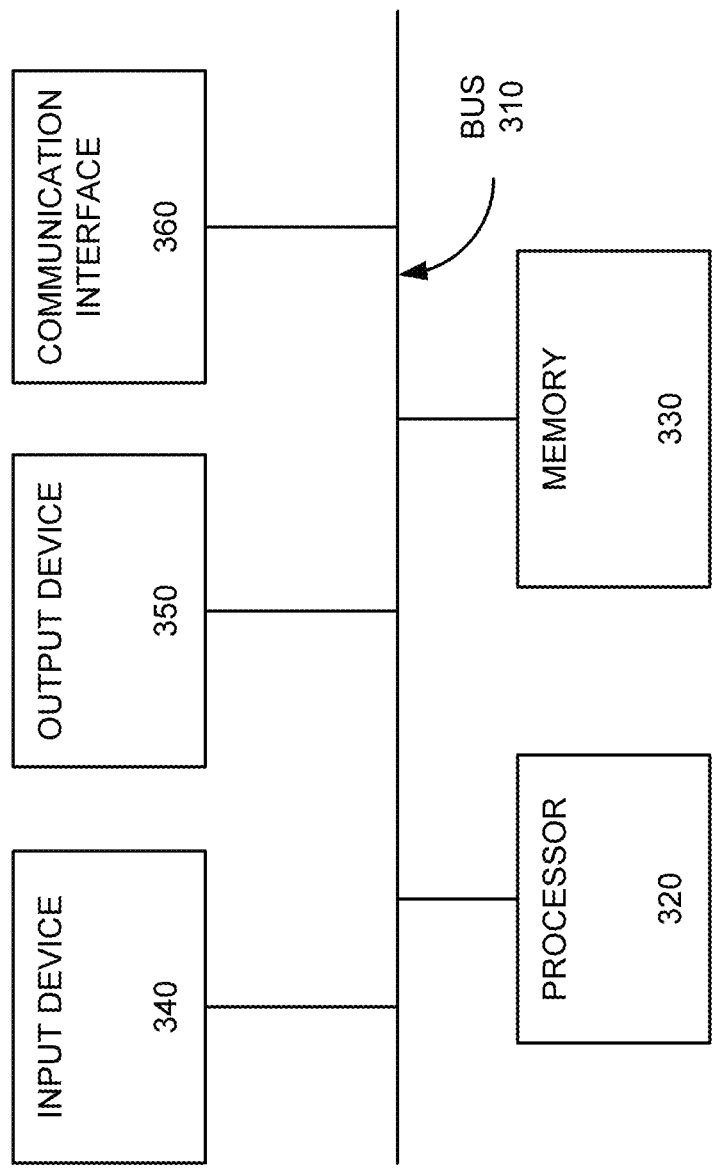
FIG. 3 is a diagram of example components of one or more devices of FIG. 2.

FIG. 3 is a diagram of example components of a device 300. For example, device 300 may correspond to user device 210, local router 220, client device 250, application distribution server 270, and/or content server 280. Each of user device 210, local router 220, client device 250, application distribution server 270, and/or content server 280 may include one or more devices 300 or one or more of the components of device 300.

As depicted, device 300 may include bus 310, processor 320, memory 330, input device 340, output device 350, and communication interface 360. However, in other implementations, device 300 may include fewer components, additional components, different components, or differently arranged components than those illustrated in FIG. 3.

Bus 310 may include one or more component subsystems and/or communication paths that enable communication among the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 320 may control the overall operation, or a portion thereof, of device 300, based on, for example, an operating system and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks. For example, communication interface 360 may include some type of wireless or wired interface. Communication interface 330 may also include an antenna (or a set of antennas) that permit wireless communication, such as the transmission and reception of radio frequency (RF) signals.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
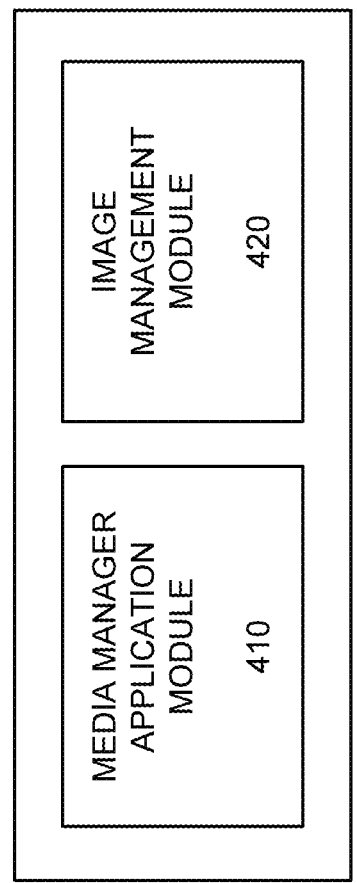
FIG. 4 is a diagram of example functional components of a user device according to one or more implementations described herein.

FIG. 4 is a diagram of example functional components of user device 210 according to one or more implementations described herein. As illustrated, user device 210 may include media manager application module 410 and image management module 420. Depending on the implementation, one or more of modules 410-420 may be implemented as a combination of hardware and software based on the components illustrated and described with respect to FIG. 3. Alternatively, modules 410-420 may each be implemented as hardware based on the components illustrated and described with respect to FIG. 3.

Media manager application module 410 may provide functionality with respect to a media manager application. For example, media manager application module 410 may enable user device 210 to execute a media manager application. As mentioned above, a media manager application may enable a user of user device 210 to manage media files stored by user device 210 and/or browse, purchase, and/or download additional media files from content server 280. In some implementations, a media manager application may also, or alternatively, enable a user of user device 210 to stream one or more media files stored by user device 210 to other devices, including other user devices 210, client devices 250 (e.g., STBs), and/or one or more other types of electronic devices.

Image management module 420 may provide functionality with respect to media manager interface 130. For example, image management module 420 may enable user device 210 to access interface image file 120 and generate media manager interface 130 using interface images 110 of interface image file 120. Image management module 420 may also, or alternatively, enable user device 210 to detect user interface activity corresponding to interface images 110 (e.g., a user selecting an interface button, a user scrolling through an interface content window, etc.) of the media manager interface 130 and change/update the interface images accordingly.

In addition to the functionality described above, functional components of user device 210 may also, or alternatively, provide functionality as described elsewhere in this specification. While FIG. 4 shows a particular number and arrangement of modules, in alternative implementations, user device 210 may include additional modules, fewer modules, different modules, or differently arranged modules than those depicted.

Figure 5:
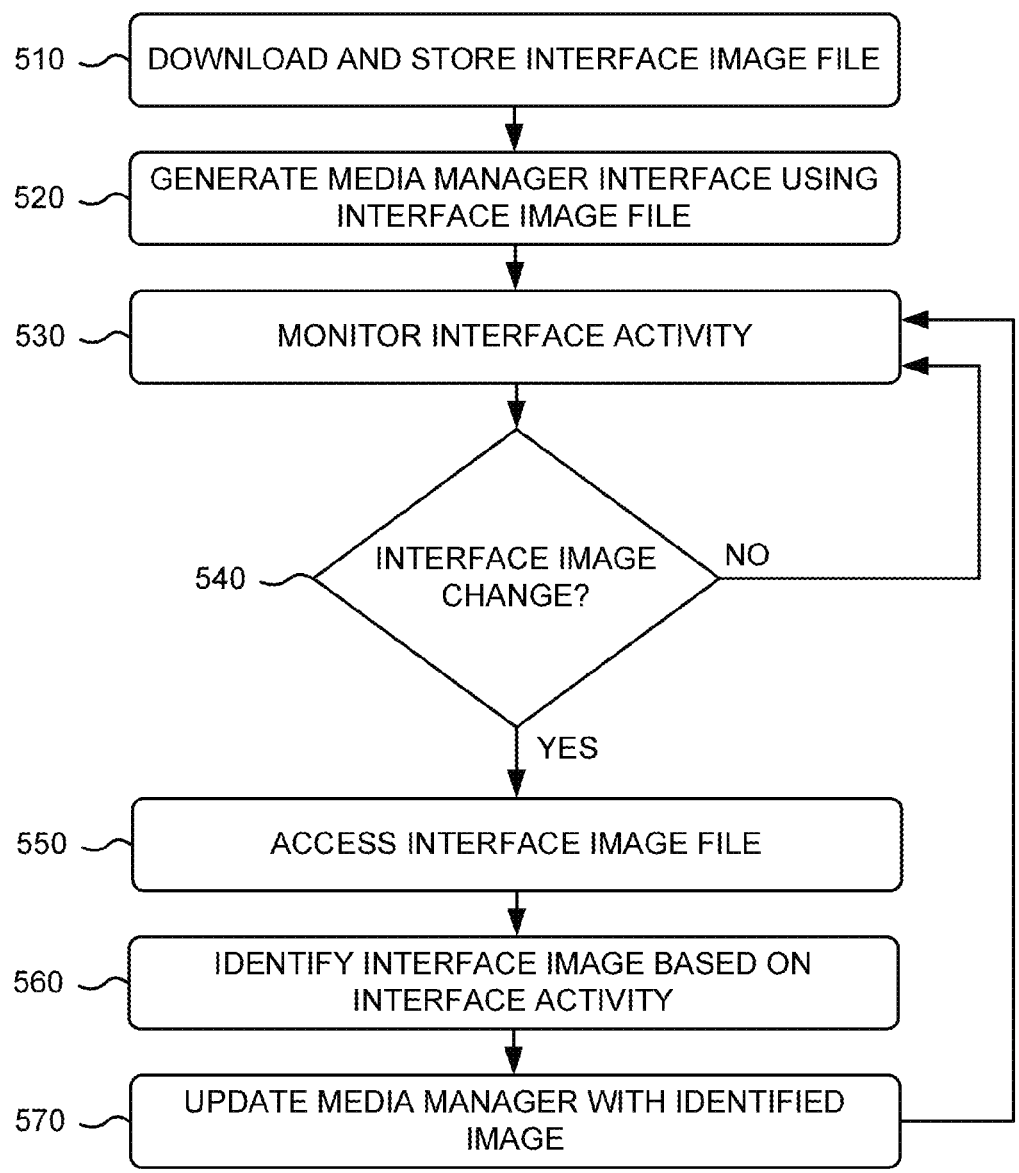
FIG. 5 is a diagram of an example process for managing interface images according to one or more implementations described herein.

FIG. 5 is a diagram of an example process 500 for managing interface images according to one or more implementations described herein. In one or more implementations, process 500 may be performed by one or more components of user device 210. In other implementations, one or more blocks of process 500 may be performed by one or more other components/devices, or a group of components/devices, including or excluding user device 210.

An interface image file may be downloaded and stored (block 510). For example, user device 210 may communicate with application distribution server 270 to receive or otherwise download an interface image file 120. Additionally, or alternatively, user device 210 may store an interface image file locally (e.g., in a local memory, a data storage device, etc.). As mentioned above, interface image file 120 may include multiple interface images 110 and an image directory that maps the location of each interface image 110 in interface image file 120. An example interface image file 120 is discussed in greater detail below with reference to FIG. 6.

The interface image file may be used to generate a media manager interface (block 520). For example, user device 210 may use interface images 110 stored in interface image file 120 to produce media manager interface 130. As mentioned above, media manager interface 130 may include any number or variety of interface objects, including navigation buttons, menu options, content windows, media control buttons, etc., that may be visually represented in media manager interface 130 using one or more interface images 110 of interface image file 120. As described in detail below with reference to FIGS. 7-8, in some implementations, all of interface images 110 of interface image file 120 may not be displayed by media manager interface 130 simultaneously.

Interface activity may be monitored (block 530). For example, user device 210 may monitor inputs, outputs, requests, commands, and/or one or more other types of operations relating to media manager interface 130. A user may be the source of some interface activity. For instance, a user may select an interface button to execute a search, make a purchase, organize local media files, or interact with media manager interface 130 in one or more of a variety of ways. Additionally, or alternatively, processes internal to user device 210 may be a source of some interface activity. For instance, user device 210 may receive data from an external device, such as application distribution server 270 or content server 280, and cause media manager interface 130 to be updated accordingly. These and other types of interface activity may be monitored by, for example, user device 210. Additionally, or alternatively, user device 210 may monitor interface activity at some time after determining that an interface image change is not required (block 540—No).

A determination may be made whether an interface image change is needed (block 540). For example, user device 210 may determine whether a detected interface image change is needed based on interface activity detected by user device 210. For instance, in some implementations, media manager interface 130 may be arranged to alter the appearance of interface buttons or other icons when a user hovers a mouse pointer over an icon. As such, when a user hovers a mouse pointer over an icon in media manager interface 130, user device 210 may determine that an interface image change is needed with respect to media manager interface 130. Additional examples of interface images changes are provided below with reference to FIG. 8.

An interface image file may be accessed (block 550). For example, user device 210 may access interface image file 120. As mentioned above, interface image file 120 may have been downloaded from application distribution server 270 and/or stored locally by user device 210. Additionally, or alternatively, user device 210 may access interface image file 120 at some time after determining that an interface image change is required (block 540—Yes).

An interface image may be identified based on the interface activity (block 560). For example, user device 210 may identify a particular interface image 110 of interface image file 120 based on interface activity detected by user device 120. For instance, if user device 210 detects that a user selected a particular interface button, user device 210 may determine an interface image identifier associated with the particular interface button and the interface activity, access an interface image directory located in the header of the interface image file 120, and determine the location of the particular interface image 110 that should be used to update the media manager interface 130. Additional examples are discussed below with reference to FIGS. 6-8.

The media manager interface may be updated with the identified image (block 570). For example, user device 210 may replace an interface image 110 currently being used in media manager interface 130 with another interface image 110. In some implementations, switching one interface image 110 for another interface image 110 may be based on interface activity previously monitored by user device 210.

While FIG. 5 shows a flowchart diagram of an example process 500 for managing interface images, in other implementations, a process for managing interface images may include fewer operations, different operations, differently arranged operations, or additional operations than depicted in FIG. 5.

FIG. 6 is a diagram of an example interface image file 120 according to one or more implementations described herein. As depicted, interface image file 120 may include an image file header, an image file directory, image identifiers, image locations, image sizes, a file body, and interface images 110. The image file header may include the image file directory, and the image file directory may include an image identifier associated with an image location and an image size for each interface image 110 in the image file body.

For example, interface image 110-1 may be associated with identifier-1 and located at row 1 and column 1 (1.1) in the image file body, and image 110-7 may be associated with identifier 7 and located at row 2 and column 3 (2.3). In some implementations, when a current interface image 110 needs to be replaced by another interface image 110, user device 210 may identify the other interface image 110 by referencing the image file directory. For instance, if interface image 110-2 is currently displayed in media manager interface 130, and user device 210 needs, or is prompted by a media manager application, to replace interface image 110-2 with interface image 110-8, client device 110 may receive an image identifier from the media manager application, reference the image file directory to determine the location of interface image 110-8, and replace image interface 110-2 with image interface 110-8. As such, interface image file 120 may provide a complete, compact solution for supplying media manager interface images. In some implementations, the image size may also, or alternatively, be used for identifying an interface image, locating an interface image, or one or more other operations consistent with operations discussed herein.

While FIG. 6 includes particular types of information that are arranged according to a particular format, other implementations may include alternative types of information and/or alternative formats and arrangements. For instance, the location of each interface image 110 need not be organized by row/column and interface images 110 need not be stored in a matrix. Rather, the location of each interface image 110 may correspond to an address, an offset, a sequence, or another type of location information. Accordingly, the image file header and the image file body may include any type and/or arrangement of information consistent with the functionality described herein.

Figure 7:
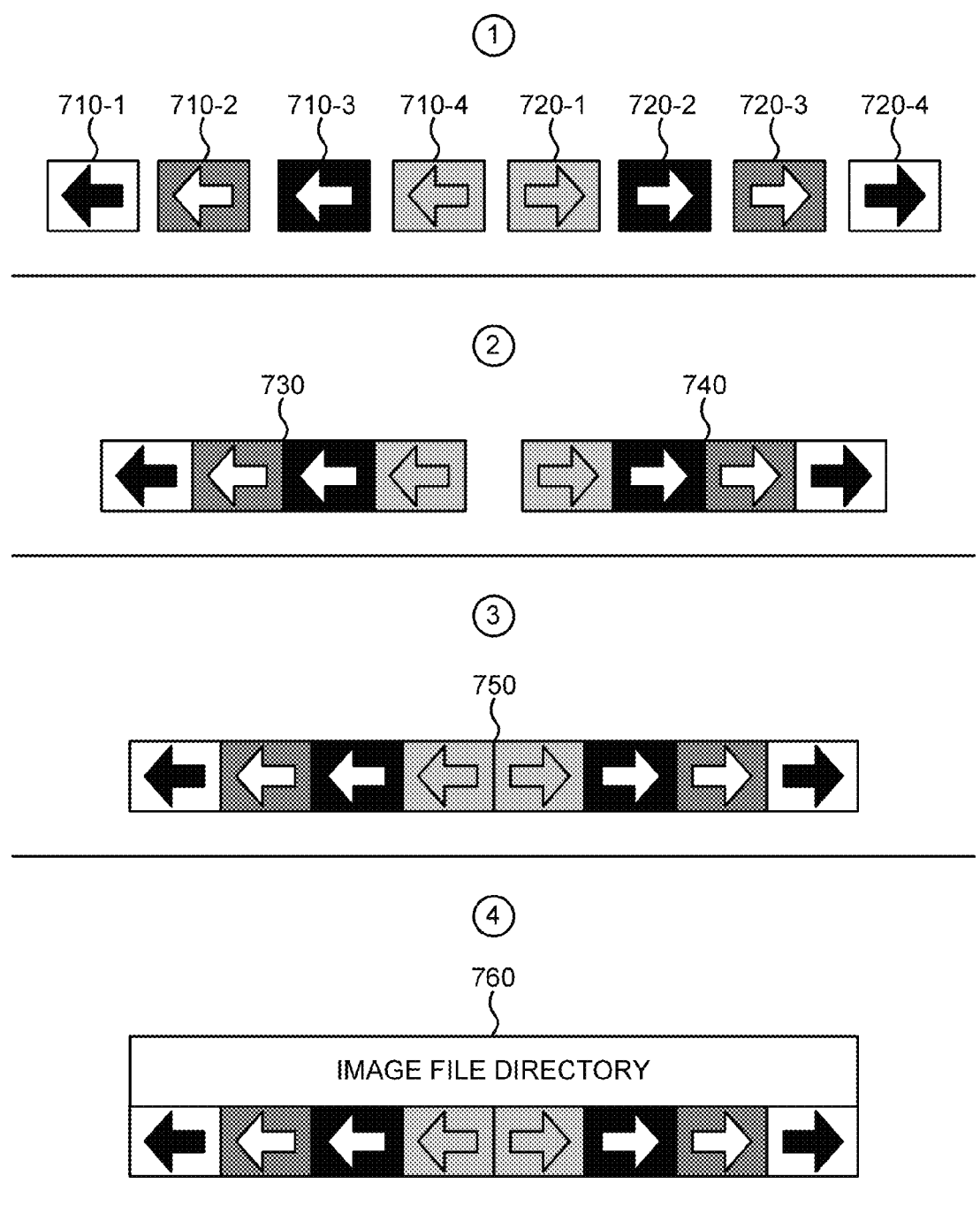
FIG. 7 is a diagram of an example process for creating an image file according to one or more implementations described herein.

FIG. 7 is a diagram of an example process 700 for creating an interface image file according to one or more implementations described herein. In one or more implementations, process 700 may be performed by one or more components of user device 210. In other implementations, one or more blocks of process 700 may be performed by one or more other components/devices, or a group of components/devices, including or excluding user device 210.

Process 700 may include collecting, designing, or otherwise producing image files 710 and 720 that correspond to one or more media manager interface objects (event 1). For instance, in the depicted example of FIG. 7, image files 710-1, 710-2, 710-3, and 710-4 may correspond to different states of one interface object (e.g., a page-back navigation button), and image files 720-1, 720-2, 720-3, and 720-4 may correspond to different states of another interface object (e.g., a page-forward navigation button).

For instance, image file 710-1 may be used in a media manager interface to represent that a page-back navigation button that is active (e.g., may be pressed by a user to initiate a page-back operation by the media manager application). Image file 710-2, by contrast, may be used when a mouse pointer or other pointing interface device is hovering over an active page-back navigation button. Image file 710-3 may be used in scenarios where a user has initiated a page-back operation by selected an active page-back navigation button and the media manager application is currently executing the page-back operation. Image file 710-4 may represent a page-back navigation button that is inactive (e.g., a user will get no response from the media manager interface or the media manager application by selecting an interface button represented by image file 710-4. In a similar manner, image files 720-1, 720-2, 720-3, and 720-4 may represent states of a page-forwarded navigation button.

Image files 710-1, 710-2, 710-3, and 710-4 may be used to synthesize an image file 730 that includes the images of image files 710-1, 710-2, 710-3, and 710-4 (event 2). Similarly, image files 720-1, 720-2, 720-3, and 720-4 may be used to synthesize an image file 740 that includes the images of image files 720-1, 720-2, 720-3, and 720-4 (event 2). In a similar fashion, image file 730 and image file 740 may be used to synthesize a single image the 750 that includes all of the images in one data structure (event 3). An image file directory may be added to image file 750 to form an interface image file 760 (event 4), which may be similar to the interface image file discussed above with reference to FIG. 6.

While FIG. 7 shows a flowchart diagram of an example process 700 for creating an interface image file, in other implementations, a process for creating an interface image file may include fewer operations, different operations, differently arranged operations, or additional operations than depicted in FIG. 7.

FIG. 8 is a diagram of example media management interfaces 800 according to one or more implementations described herein. Media management interface 800 may include a page-back navigation button 812, a page-forward navigation button 814, navigation links, and a content window. In the depicted example, we shall assume that media manager interface 800 was recently opened (state 810), which is why page-back navigation button 812 is inactive, the page-forward navigation button 814 is inactive, and the content window is displaying a first content window.

Further to this example, a user may navigate from a first content page to a second content page (state 820) by selecting a navigation link provided by media management interface 800. In such a scenario, user device 210 may detect the selection of the navigation link by the user and determine that an image corresponding to the page-back navigation button 812 must be replaced. As such, since media management interface 800 has transitioned from a first content window (state 810) to a second content window (state 820), user device 210 may determine that the appropriate image for the page-back navigation button 812 is an interface image that will communicate the active status of page-back interface button 812. However, since media management interface 800 has only transitioned from a first content window to a second content window, user device 210 may not detect a need or otherwise be prompted to replace the interface image corresponding to the page-forward interface button 814.

A user may consider returning to the first content page by selecting the active page-back interface button 812. In so doing, the user may cause mouse pointer 832, or another interface pointer object, to hover over (e.g., mouse-over) page-back interface button 812 (state 830). User device 210 may detect that mouse pointer 832 is hovering over page-back navigation button 812 and, in response, replace the current interface image with an interface image consistent with a mouse-over scenario, which may help indicate to the user that page-back navigation button 812 is active.

Deciding to return to the first content window, the user may proceed by selecting page-back interface button 812 (state 840). User device 210 may detect that the user has selected page-back interface button 812 and, in response, may again replace the current interface image corresponding to page-back interface button 812 to indicate that an operation corresponding to page-back interface button 812 is being performed by the media manager application. At some point after the page-back operation is complete, user device 210 may now detect that the interface images corresponding to page-back interface button 812 and page-forward interface button 814 need to be replaced to accurately portray the inactive status of page-back interface button 812 (e.g., since media management interface 800 is back to the first content window) and to accurately portray the active status of page-forward interface button 814 (e.g., since the second content window has been cached to memory and may be accessed by selecting page-forward interface button 814).

FIG. 9 is a diagram of an example solution for animating user interface objects 900 according to one or more implementations described herein. Interface image file 910 may include a series of visually-related interface images. Visually-related interface images, as used herein, may include a sequence of interface images that, when viewed sequentially, may create a visual animation. In some implementations, each of the interface images of interface image file 910 may be sequentially displayed in, for example, the image frame of media manager interface 920. For illustration purposes, when sequentially displayed in accordance with a particular rate (e.g., frame rate), the image frame of media manager interface 920 may appear as an animated object 930. Accordingly, in one or more implementations disclosed herein, static images may be used to create an animation within media manager interface 920.

In light of the above, one or more implementations described herein may be used to provide an efficient and reliable solution to managing media manager images. For example, user device 210 may download, store, and/or access interface image file 120 that includes multiple interface images 110. User device 210 may generate media manager interface 130 using interface images 110 of interface image file 120. User device 210 may detect interface activity corresponding to interface images 110 used to generate media manager interface 130 and replace interface images 110 used to generate media manager interface 130 with other interface images 110 of interface image file 120 based on the interface activity. Accordingly, one or more implementations described herein may include providing an image-intensive user interface that requires only one image file.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   storing, by a user device, a first interface image file including a first set of interface images corresponding to multiple operational states of a first user interface object associated with a first navigational direction;
   storing, by the user device, a second interface image file including a second set of interface images corresponding to multiple operational states of a second user interface object associated with a second navigational direction opposite the first navigational direction;
   storing, by the user device, a single interface image file comprising the first and second interface image files with an image file directory comprising a plurality of image identifiers for the first and second sets of interface images;
   generating, by the user device, a media manager interface using the plurality of image identifiers, of the single interface image file, corresponding to the first and second user interface objects;
   presenting, by the user device, navigational links to media content accessible via the media manager interface for display,
      wherein a first interface image is associated with a first operational state of the first user interface object with respect to an accessibility of a first cached media content, and a second interface image is associated with a first operational state of the second user interface object with respect to an accessibility of a second cached media content;
   detecting, by the user device, interface activity with respect to the first operational state of the first user interface object corresponding to the first cached media content presented for display via the media manager interface;
   replacing, by the user device, the first interface image with another interface image, of the single interface image file, associated with a second operational state of the first user interface object, based on the interface activity, to generate a first modified media manager interface;
   presenting, by the user device, the other interface image via the first modified media manager interface for display;
   determining, in an absence of interface activity with respect to the first modified media manager interface, that at least one of:
      the other interface image does not correspond to a current operational state of the first user interface object with respect to the accessibility of the first cached media content, or
      the second interface image does not correspond to a current operational state of the second user interface object with respect to the accessibility of the second cached media content;
   replacing, by the user device, the at least one of the other interface image or second interface image with a different interface image from the single interface image file, corresponding to the current operational state with respect to the accessibility of the first or second cached media content, to generate a second modified media manager interface; and
   presenting, by the user device, the second modified media manager interface for display.

2. The method of claim 1, wherein the single interface image file comprises an image file body and an image file header, the image file body comprising the plurality of interface images and the image file header comprising the image file directory to identify the locations of each of the plurality of interface images in the image file body.

3. The method of claim 2, wherein generating the media manager interface comprises:
   identifying the first and second sets of interface images for generating the media manager interface;
   using the image file header to locate the first and second sets of interface images identified for generating the media manager interface; and
   retrieving, from the image file body, the first and second sets of interface images identified for generating the media manager interface using the image file header.

4. The method of claim 2, wherein replacing the first interface image comprises:
   identifying, based on the interface activity, the other interface image to replace the first interface image,
   accessing the image file header of the single interface image file, and
   retrieving, from the image file body and using the image file header, the other interface image identified to replace the first interface image.

5. The method of claim 1, where the media manager interface corresponds to a media manager program to enable a user of the media manager program to browse for, download, or organize electronic media files.

6. The method of claim 5, wherein the first and second user interface objects comprises interface button images, for use in the media manager program, at different states of operation.

7. The method of claim 1, further comprising:
   creating an animated user interface object by:
      selecting a set of visually-related interface images from the single interface image file, and
      sequentially replacing each interface image of the set of visually-related interface images, within the media manager interface, in accordance with a replacement rate.

8. A user device, comprising:
   a memory to store instructions; and
   a processor, connected to the memory, configured to execute one or more of the instructions to:
      store a first interface image file including a first set of interface images corresponding to multiple operational states of a first user interface object associated with a first navigational direction,
      store a second interface image file including a second set of interface images corresponding to multiple operational states of a second user interface object associated with a second navigational direction opposite the first navigational direction, store a single interface image file comprising the first and second interface image files with an image file directory comprising a plurality of image identifiers for the first and second sets of interface images, generate a media manager interface using the plurality of image identifiers of the single interface image file, corresponding to the first and second user interface objects, wherein the media manager interface corresponds to a media manager program to enable a user of the media manager program to browse for, download, or organize electronic media files, present, via the media manager interface, navigational links to the electronic media files for display, wherein a first interface image is associated with a first operational state of the first user interface object with respect to an accessibility of a first cached electronic media file, and a second interface image is associated with a first operational state of the second user interface object with respect to an accessibility of a second cached electronic media file, detect interface activity with respect to the first operational state of the first user interface object corresponding to the first cached electronic media file presented for display via the media manager interface, replace the first interface image with another interface image, of the single interface image file, associated with a second operational state of the first user interface object, based on the interface activity, to generate a first modified media manager interface, present, via the first modified media manager interface, the other interface image for display, and determine, in an absence of interface activity with respect to the first modified media manager interface, that the other interface image does not correspond to a current operational state of the first user interface object with respect to the accessibility of the first cached electronic media file and that the second interface image does not correspond to a current operational state of the second user interface object with respect to the accessibility of the second cached electronic media file.

9. The user device of claim 8, wherein the single interface image file comprises an image file body and an image file header, the image file body comprising the plurality of interface images and the image file header comprising the image file directory to map each of the plurality of interface images in the image file body.

10. The user device of claim 9, wherein, to generate the media manager interface, the processor is configured to:
identify the first and second sets of interface images for generating the media manager interface,
use the image file header to locate the first and second sets of interface images identified for generating the media manager interface, and
retrieve, from the image file body, the first and second sets of interface images identified for generating the media manager interface using the image file header.

11. The user device of claim 9, wherein, to replace the first interface image the processor is configured to:
identify, based on the interface activity, the other interface image to replace the first interface image,
use the image file header to locate the other interface image identified to replace the first interface image,
retrieve, from the image file body, the identified interface image identified to replace the first interface image, and
replace the first interface image, within the media manager interface, with the retrieved interface image.

12. The user device of claim 8, wherein the first and second user interface objects comprise interface button images, for use in the media manager program, at different states of operation, and
wherein the processor is further configured to:
replace the other interface image and the second interface image with different interface images of the single interface image file, corresponding to the current operational states, respectively, to generate a second modified media manager interface; and
present the second modified media manager interface for display.

13. The user device of claim 8, wherein the processor is further configured to execute one or more of the instructions to create an animated user interface object, and to:
select a set of visually-related interface images from the single interface image file, and
sequentially replace each interface image of the set of visually related interface images in accordance with a replacement rate.

14. A non-transitory computer-readable medium storing a program for causing a device to perform a method, the method comprising:
storing a first interface image file including a first set of interface images corresponding to multiple operational states of a first user interface object associated with a first navigational direction;
storing a second interface image file including a second set of interface images corresponding to multiple operational states of a second user interface object associated with a second navigational direction opposite the first navigational direction;
storing a single interface image file comprising the first and second interface image files with an image file directory comprising a plurality of image identifiers for the first and second sets of interface images,
wherein the single interface image file comprises an image file body and an image file header, the image file body comprising the first and second sets of interface images and the image file header comprising an image directory to identify the location of the plurality of interface images in the image file body;
generating a media manager interface using the first and second sets of interface images, of the single interface image file,
wherein a first interface image is associated with a first operational state of the first user interface object, and a second interface image is associated with a first operational state of the second user interface object;
presenting, via the media manager interface, the first and second sets of interface images for display,
wherein a first interface image is associated with a first operational state of a first user interface object with respect to an accessibility of a first cached media content, and a second interface image is associated with a first operational state of a second user interface object with respect to an accessibility of a second cached media content;
detecting interface activity with respect to the first operational state of the first user interface object corresponding to the first cached media content presented for display via the media manager interface;

replacing the first interface image with another interface image, of the single interface image file, associated with a second operational state of the first user interface object, based on the interface activity, to generate a first modified media manager interface;

presenting, via the first modified media manager interface, the other interface image for display; and determining, in an absence of interface activity with respect to the first modified media manager interface, that the other interface image does not correspond to a current operational state of the first user interface object with respect to the accessibility of the first cached media content and that the second interface image does not correspond to a current operational state of the second user interface object with respect to the accessibility of the second cached media content.

15. The non-transitory computer-readable medium of claim 14, wherein generating the media manager interface comprises:

identifying the first and second sets of interface images for generating the media manager interface;

using the image file header to locate the first and second sets of interface images identified for generating the media manager interface; and retrieving, from the image file body, the interface images identified for generating the media manager interface.

16. The non-transitory computer-readable medium of claim 14, wherein replacing the first interface image comprises:

identifying, based on the interface activity, the other interface image to replace the first interface image, using the image file header to locate the identified other interface image, retrieving, from the image file body, the identified other interface image, and replacing the first interface image, within the media manager interface, with the retrieved other interface image.

17. The non-transitory computer-readable medium of claim 14, wherein the media manager interface corresponds to a media manager program to enable a user of the media manager program to browse for, download, or organize electronic media files.

18. The non-transitory computer-readable medium of claim 17, wherein the first and second user interface objects comprise interface button images at different states of operation of the media manager program, the method further comprising:

replacing the other interface image and the second interface image with different interface images of the single interface image file, corresponding to the current operational states, respectively, to generate a second modified media manager interface; and presenting, by the user device, the second modified media manager interface for display.

19. The non-transitory computer-readable medium of claim 14, further comprising:

creating an animated user interface object by:

selecting a set of visually related interface images from the single interface image file, and sequentially replacing each interface image of the set of visually related interface images in accordance with a replacement rate.

20. The non-transitory computer-readable medium of claim 14, further comprising:

communicating with an application distribution server;

downloading the single interface image file from the application distribution server; and storing the single interface image file locally at the device.

* * * * *